March 2, 1965 J. OTT 3,171,527
FRICTION DEVICE
Filed Dec. 29, 1959
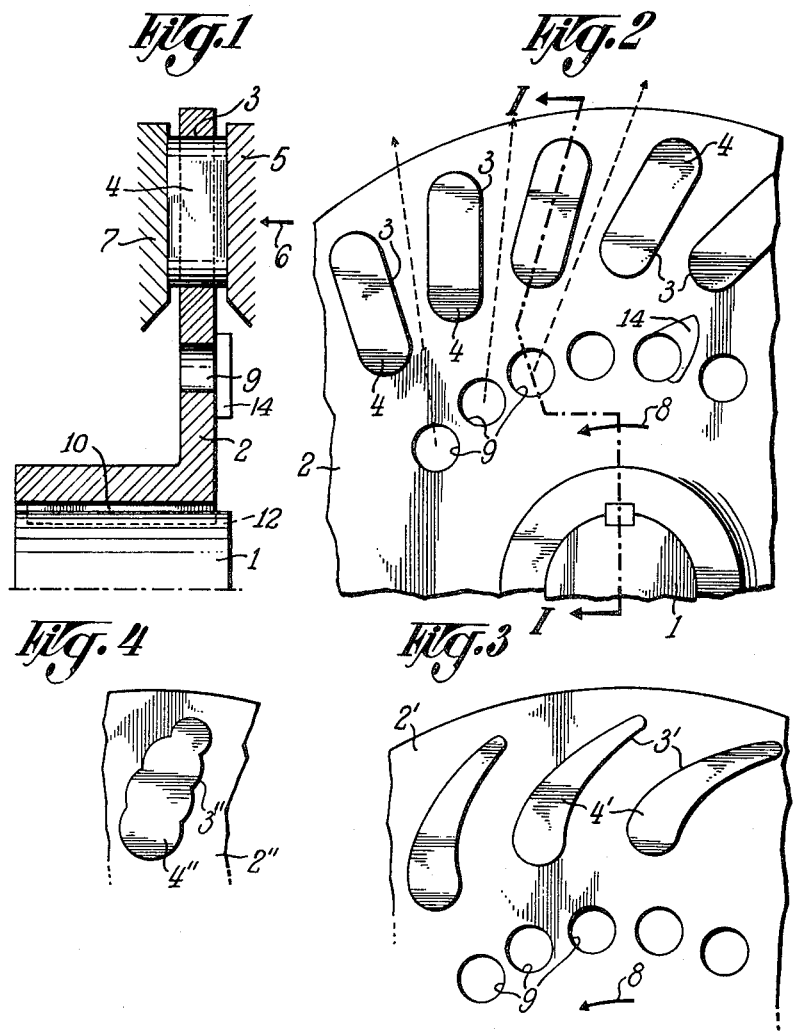
INVENTOR
Josef Ott
BY Nolte & Nolte
ATTORNEYS United States Patent Office 3,171,527
Patented Mar. 2, 1965

3,171,527
FRICTION DEVICE
Josef Ott, Faurndau, near Goppingen, Germany, assignor to L. Schuler A.G., Goppingen, Germany
Filed Dec. 29, 1959, Ser. No. 862,532
Claims priority, application Germany, Dec. 31, 1958, Sch 25,279
8 Claims. (Cl. 192—113)

This invention relates in general to friction couplings or brakes and in particular to a new and useful friction coupling, including a disc member having a plurality of laterally extending friction blocks of a configuration to produce a cooling air flow in the vicinity of the coupling.

The present invention has particular application for a press or punching machine or similar apparatus in which the friction couplings are subject to high stresses which generate a considerable quantity of heat. In devices of this nature there are a multiplicity of closely spaced parts which prevent adequate ventilation of the couplings and hence the unit overheats in these areas.

In accordance with the present invention, there is provided a novel friction coupling which includes friction blocks shaped and arranged as air circulating vanes so that the rotating disc upon which the blocks are arranged acts as a blower to circulate cooling air in the vicinity of the friction blocks. In accordance with one aspect of the invention, the friction blocks are arranged along an annular area of a coupling disc for contact by a braking or clutching member in the usual manner. The blocks are radially offset with the forward leading edges spaced closer to the center of the disc and the trailing outer edges offset rearwardly in respect to the direction of the rotation of the disc. By making the blocks of elongated shape with the outer edges offset in a direction away from the direction of rotation, the shearing stresses acting on the blocks are materially reduced. The blocks are advantageously shaped both to minimize the shearing stresses which will be acting thereon and to cause the blocks to function as an air directing foil for the circulation of cooling air in their vicinity. By angling the blocks from a radial line rearwardly away from the direction of rotation, both the shearing stresses are reduced and the air circulating effect caused by the laterally extending blocks is increased.

It should be appreciated, in accordance with the invention, that it is not always easy to make the air foil cut-out shapes in the coupling disc to accommodate blocks of such shape. However, the advantages which are obtained by the use of such air foil friction block shapes, both the increase in the cooling air and the reduction in the shearing stresses on the blocks are so important in respect to the reduction of the wear of the blocks as to make any minor disadvantages of construction more than worthwhile.

In a preferred embodiment of the invention, the friction blocks are made in a shape in which they are about twice as long as they are wide and have rounded corners and are set at an angle to the radius with their outer edges trailing in the direction away from the direction of rotation. With such an arrangement, the openings in the coupling disc can be easily made by drilling two bores into the disc at spaced locations and cutting away the material between the bored holes to accommodate the friction blocks.

Accordingly, it is an object of this invention to provide an improved coupling, including laterally extending friction discs shaped to cause air flow in the vicinity of the coupling.

A further object of the invention is to provide a friction disc or brake member including a plurality of friction disc members spaced around an annular section thereof and angled so that their outer edges are rearward of the inner edges in respect to the direction of rotation to provide a friction braking surface which is subject to a minimum of stress and which provides vanes circulating air in the vicinity of the coupling.

A further object of the invention is to provide a coupling which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a longitudinal section of a portion of a brake or coupling having friction blocks constructed in accordance with the invention;

FIG. 2 is a fragmentary side elevation of the coupling indicated in FIG. 1;

FIG. 3 is a fragmentary side elevation similar to FIG. 2 of another embodiment of coupling; and FIG. 4 is a fragmentary side elevation of still another embodiment of coupling.

Referring to the drawings in particular, the invention as embodied therein includes a hubbed disc member 2 which is keyed to a shaft 1 for rotation therewith but which is axially slidable thereon. For this purpose, a key 10 of the hubbed disc 2 is made of lesser longitudinal dimension than a keyway 12 which is cut in the shaft 1. The hubbed disc 2 is arranged to rotate adjacent a stationary annular member 7 and it is provided with openings 3 to accommodate friction blocks 4 which may be urged against the member 7 for the purposes of braking or coupling. An annular member 5 which rotates with the shaft 1 is connected to a pressure cylinder (not shown) which upon braking or coupling is moved in the direction of the arrow 6 to cause the member 5 to bear on the friction blocks 4 and urge them against the stationary plate 7.

In accordance with the invention, the friction blocks 4 in the embodiment illustrated in FIGS. 1 and 2 are made of an elongated or oval shape and are offset radially so that their outer edges are rearward of the inner edges in respect to the direction of rotation of the disc 2. The disc 2 is provided with a plurality of openings 9 which permit air flow from one side of the disc to the other. The friction blocks 4 extend laterally outwardly a sufficient distance so that they act as fan blades to move the air in the vicinity of the disc 2 and preferably direct air radially outwardly upon rotation of the disc 2.

The openings 3 which accommodate the friction blocks may be advantageously made by drilling two spaced bores and connecting the bores by cutting away the material therebetween. The blocks are made somewhat smaller than the openings so that they may slide in the openings somewhat. Because the blocks are angled in respect to a radial line, the stresses acting on the blocks are minimized. Thus, the complete coupling has an improved mechanical strength because of the lower shearing stresses which act on the friction blocks 4. In some instances, it is desirable to provide deflecting vanes 14 adjacent the openings 9 in order to control the flow of air in the vicinity of the blocks 4 and on each side of the hubbed disc 2.

In the embodiment illustrated in FIG. 3, the friction blocks are made to the curvature of an air foil section, the openings 3' being suitably cut away to accommodate such blocks. With such a shape, the blocks 4 function to guide air from the central portion of the disc 2 radially outwardly between the vane-shaped blocks 4'.

In FIG. 4 another embodiment of the invention is shown in which the friction blocks 4" are made to an outline which permits them to be inserted into a series of overlapped drilled bores to give the configuration of openings 3". The bores may have the same or different diameters and the centers are preferably arranged on a line which is inclined with respect to a radial line of a disc 2". The block 4" is advantageously positioned so that its outer edge is rearward of its inner edge in respect to the direction of rotation of the disc 2".

While specific embodiments of the invention have been shown and described to illustrate the application of the invention principles, those skilled in the art will realize that the invention may be embodied otherwise without departing from such principles.

What is claimed is:

1. A friction device comprising a rotary disc and a plurality of friction blocks carried thereby for rotation therewith, said blocks projecting laterally from said disc and being circumferentially distributed about the center thereof, and each block having a length substantially greater than its width, said blocks respectively having inner ends located nearer to said center than outer ends of said blocks and said outer ends of said blocks being angularly displaced rearwardly with respect to said inner ends in the direction of rotation of said disc, and said inner ends having a rounded, convexly curved configuration, said blocks defining between themselves passages extending substantially spirally with respect to said center and diverging outwardly away from said center.

2. A friction device according to claim 1, wherein said disc is formed with a plurality of openings of substantially the same configuration as said blocks and in which said blocks are respectively located to be carried by said disc.

3. A friction device according to claim 1, wherein said outer ends are also rounded and of a convexly curved configuration.

4. A friction device according to claim 1, wherein said blocks are respectively of air foil configuration with each block having an elongated convexly curved leading side edge and an elongated concavely curved trailing side edge and said blocks respectively tapering from said inner ends toward said outer ends.

5. A friction device according to claim 1 further comprising openings in said disc spaced inwardly from said blocks and deflectors extending axially from said disc adjacent said openings for directing air in the vicinity of said disc.

6. A friction device comprising a rotatable disc formed with a plurality of circumferentially spaced apertures occupying an annular area of said disc member, the edges of said apertures describing a plurality of intersecting bores, a plurality of block members extending laterally on either side of said disc member and through said apertures, said block members being shaped complementarily to said apertures for retention therein against radial movement relative to said disc member, the center lines of said apertures and said block members being inclined at an angle relative to the radii of said disc member and extending rearwardly toward the periphery of said disc member relative to its direction of rotation.

7. A friction device according to claim 6, wherein said intersecting bores have different diameters.

8. A friction device according to claim 7, wherein the spaces between said block members taper outwardly substantially from the inner ends of opposing members to the periphery of said disc member.

References Cited by the Examiner
UNITED STATES PATENTS

| 461,713 | 10/91 | Rowell | 192—107 X |
| 1,452,609 | 4/23 | Kloche | 192—113 X |
| 2,033,835 | 3/36 | Lansing | 192—104 |
| 2,107,954 | 2/38 | Morton et al. | 192—113 |
| 2,180,086 | 11/39 | Kraft | 192—113 X |
| 2,581,637 | 1/52 | Danly et al. | 192—113 |
| 2,986,253 | 5/61 | Brantingham | 192—113 |
| 2,971,611 | 2/61 | Gage | 188—264 X |

FRANK SUSKO, Primary Examiner.

DAVID J. WILLIAMOWSKY, ROBERT C. RIORDON, Examiners.